US012657855B2

(12) United States Patent
Yoneda

(10) Patent No.: US 12,657,855 B2
(45) Date of Patent: Jun. 16, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keigo Yoneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 18/816,308

(22) Filed: Aug. 27, 2024

(65) Prior Publication Data

US 2024/0420439 A1      Dec. 19, 2024

Related U.S. Application Data

(63) Continuation of application No. PCT/JP2022/042691, filed on Nov. 17, 2022.

(30) Foreign Application Priority Data

Mar. 3, 2022      (JP) ................................. 2022-032504

(51) Int. Cl.
*G06T 19/20*          (2011.01)
*G06T 7/70*          (2017.01)
          (Continued)

(52) U.S. Cl.
CPC ................ *G06T 19/20* (2013.01); *G06T 7/70* (2017.01); *G06T 7/90* (2017.01); *G06T 15/04* (2013.01);
          (Continued)

(58) Field of Classification Search
CPC .. G06T 19/20; G06T 7/70; G06T 7/90; G06T 15/04; G06T 15/10; G06T 15/20;
          (Continued)

(56) References Cited

U.S. PATENT DOCUMENTS

| 11,227,429 B2 | 1/2022 | Ito |
| 11,282,265 B2 | 3/2022 | Kobayashi |

(Continued)

FOREIGN PATENT DOCUMENTS

| JP | H10-283487 A | 10/1998 |
| JP | 2019-215622 A | 12/2019 |

(Continued)

OTHER PUBLICATIONS

Mar. 3, 2026 Japanese Official Action in Japanese Patent Appln. No. 2022-032504.

(Continued)

*Primary Examiner* — Cory A Almeida
(74) *Attorney, Agent, or Firm* — Venable LLP

(57)          ABSTRACT

An object is to output data with which it is possible to generate a virtual viewpoint image of high image quality while suppressing the amount of data. The information processing apparatus according to the present disclosure obtains virtual viewpoint information for identifying a position of a virtual viewpoint and a line-of-sight direction from the virtual viewpoint, generates color information for an element configuring three-dimensional shape data for identifying a three-dimensional shape of an object based on the virtual viewpoint information and a plurality of images captured from a plurality of imaging devices, and outputs the three-dimensional shape data and the color information.

16 Claims, 13 Drawing Sheets

(51) Int. Cl.

| | | |
|---|---|---|
| *G06T 7/90* | (2017.01) | |
| *G06T 15/04* | (2011.01) | |
| *G06T 15/10* | (2011.01) | |
| *G06T 15/20* | (2011.01) | |

(52) U.S. Cl.
CPC .............. *G06T 15/10* (2013.01); *G06T 15/20* (2013.01); *G06T 2200/04* (2013.01); *G06T 2207/10024* (2013.01); *G06T 2219/2012* (2013.01)

(58) Field of Classification Search
CPC ....... G06T 2200/04; G06T 2207/10024; G06T 2219/2012
See application file for complete search history.

(56) References Cited

U.S. PATENT DOCUMENTS

| | | | |
|---|---|---|---|
| 11,961,250 B2 | 4/2024 | Morimoto | |
| 2001/0043737 A1* | 11/2001 | Rogina | H04N 13/117 |
| | | | 348/E13.071 |
| 2014/0375633 A1 | 12/2014 | Dillard | |
| 2019/0259173 A1* | 8/2019 | Yoshimura | G06T 7/73 |
| 2019/0340777 A1* | 11/2019 | Takama | G06T 7/70 |
| 2019/0342537 A1* | 11/2019 | Taya | H04N 13/282 |
| 2019/0378326 A1* | 12/2019 | Ito | G06T 17/00 |
| 2020/0258299 A1 | 8/2020 | Kobayashi | |
| 2020/0382764 A1 | 12/2020 | Oyman | |
| 2021/0042948 A1* | 2/2021 | Morimoto | G06T 7/557 |
| 2021/0142551 A1 | 5/2021 | Kobayashi | |
| 2021/0176450 A1* | 6/2021 | Yano | H04N 23/90 |
| 2022/0172447 A1* | 6/2022 | Tateno | H04N 5/262 |
| 2022/0189103 A1* | 6/2022 | Mizuno | G06V 10/24 |
| 2022/0230337 A1* | 7/2022 | Umemura | G06T 7/70 |
| 2024/0249419 A1* | 7/2024 | Sakai | G06T 7/70 |

FOREIGN PATENT DOCUMENTS

| | | |
|---|---|---|
| JP | 2022-032504 A | 2/2022 |
| WO | 2019/003953 A1 | 1/2019 |
| WO | 2019/198784 A1 | 10/2019 |

OTHER PUBLICATIONS

Feb. 7, 2023 International Search Report in International Patent Appln. PCT/JP2022/042691.

Mar. 13, 2026 European Official Action in European Patent Appln. No. 22929938.3.

Tomas Akenine-Möller et al., Real-Time Rendering, 3rd Edition, XP002698047, 2008, pp. 11-27 (Chapter 2) and 645-664 (Chapter 14).

\* cited by examiner

```
start header cameraparam position 100,0,0 rotation 0.5, -0.5, 0.5, -0.5 fov 30 width 1920 height 1080 end_header
```

SHAPE INFORMATION, COLOR INFORMATION

FIG.10

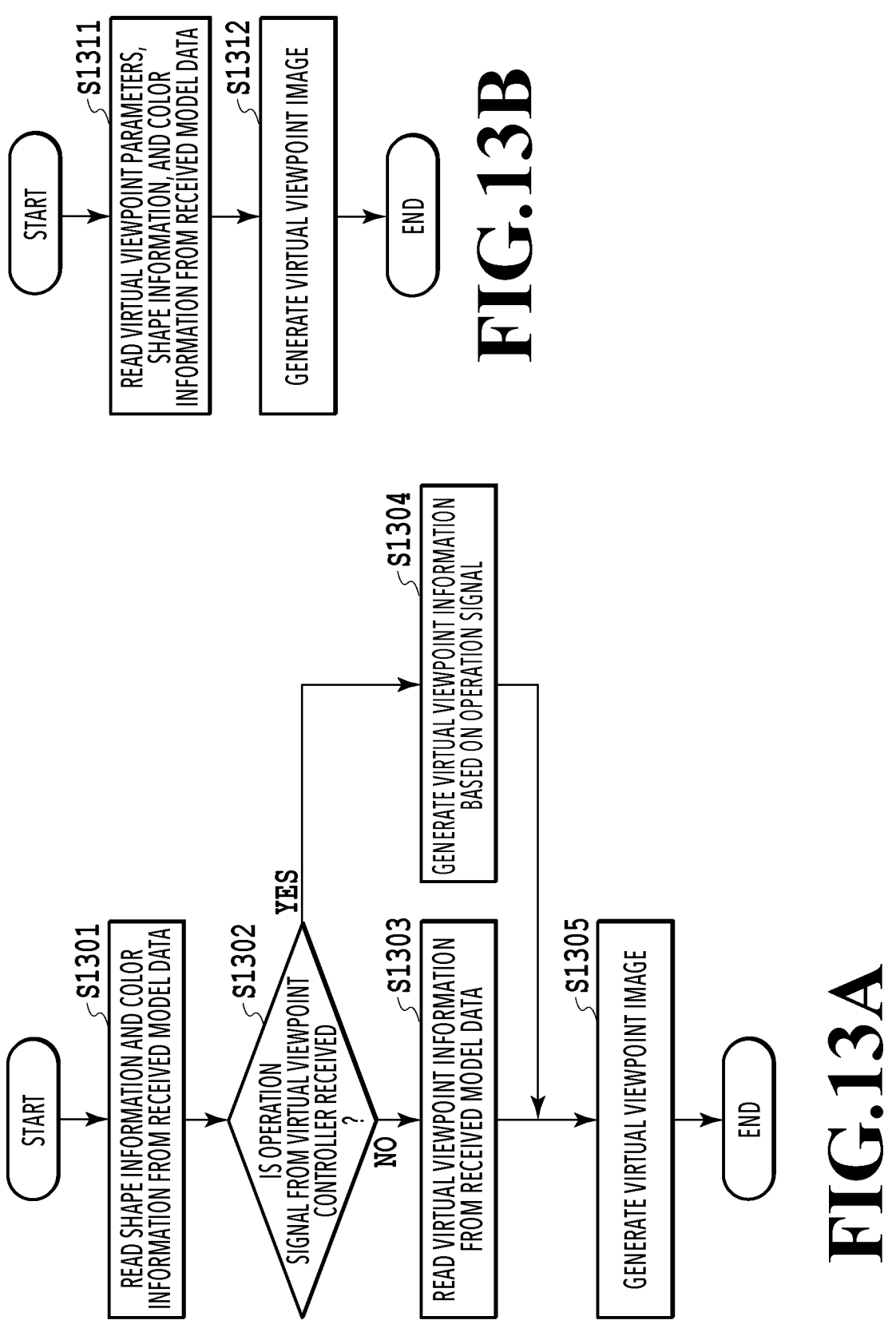

FIG.13B

S1311 READ VIRTUAL VIEWPOINT PARAMETERS, SHAPE INFORMATION, AND COLOR INFORMATION FROM RECEIVED MODEL DATA

S1312 GENERATE VIRTUAL VIEWPOINT IMAGE

FIG.13A

S1301 READ SHAPE INFORMATION AND COLOR INFORMATION FROM RECEIVED MODEL DATA

S1302 IS OPERATION SIGNAL FROM VIRTUAL VIEWPOINT CONTROLLER RECEIVED ?

YES

S1304 GENERATE VIRTUAL VIEWPOINT INFORMATION BASED ON OPERATION SIGNAL

NO

S1303 READ VIRTUAL VIEWPOINT INFORMATION FROM RECEIVED MODEL DATA

S1305 GENERATE VIRTUAL VIEWPOINT IMAGE

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2022/042691, filed Nov. 17, 2022, which claims the benefit of Japanese Patent Application No. 2022-032504, filed Mar. 3, 2022, both of which are hereby incorporated by reference herein in their entirety.

BACKGROUND OF THE INVENTION

Field of the Invention

The present disclosure relates to a technique to generate or transmit data of an object.

Background Art

There is a technique to reproduce an image (virtual viewpoint image) representing an appearance from a virtual viewpoint within a three-dimensional space by using a plurality of captured images by a plurality of imaging devices. Then, in recent years, a system has been attracting attention, which generates shape data of an object in a server and distributes the shape data to a client terminal, such as a PC and a tablet, thereby enabling a user to obtain a virtual viewpoint image by inputting a virtual viewpoint at the client terminal. Here, in a case where colors are appended to the shape data of an object, there are a method that depends on a virtual viewpoint and a method that does not, and it is possible to obtain a virtual viewpoint image of higher image quality with the method that depends on a virtual viewpoint. The reason is that in a case of the method of generating color information depending on a virtual viewpoint, it is possible to obtain color information of higher accuracy by preferentially using a captured image of an imaging device whose position and line-of-sight direction are closer to those of the virtual viewpoint. In a case where the generation of color information depending on a virtual viewpoint such as this is performed at the client terminal, it becomes necessary to transmit a tremendous amount of captured image data from the server. Consequently, a technique has been proposed which selects and transmits only shape data and captured image data of an object existing within the range of the visual field in accordance with the virtual viewpoint (see PTL 1).

However, with the technique of Patent Document 1 described above, in a case where the number of imaging devices capturing an object increases, the amount of captured image data that is transmitted from the server to the client terminal also increases proportionally, and therefore, there is a possibility that the transmission band enters a state of reaching its limit as a result.

CITATION LIST

Patent Literature

PTL 1 International Publication No. 2019/003953

SUMMARY OF THE INVENTION

The information processing apparatus according to the present invention includes: one or more memories storing instructions; and one or more processors executing the instructions to perform: obtaining virtual viewpoint information for identifying a position of a virtual viewpoint and a line-of-sight direction from the virtual viewpoint; generating color information for an element configuring three-dimensional shape data for identifying a three-dimensional shape of an object based on the virtual viewpoint information and a plurality of images captured from a plurality of imaging devices; and outputting the three-dimensional shape data and the color information.

Further features of the present invention will become apparent from the following description of exemplary embodiments with reference to the attached drawings.

BRIEF DESCRIPTION OF THE DRAWINGS

FIG. 10 is a diagram showing a data structure of model data including virtual viewpoint information;

FIG. 13A and FIG. 13B are each a flowchart showing a flow of processing to generate a virtual viewpoint image using model data at the client terminal.

DESCRIPTION OF THE EMBODIMENTS

An object of the present disclosure is to provide a technique to output data with which it is possible to generate a virtual viewpoint image of high image quality while suppressing the amount of data.

The information processing apparatus according to the present disclosure has: an obtaining unit adapted to obtain virtual viewpoint information for identifying a position of a designated virtual viewpoint and a line-of-sight direction from the virtual viewpoint; a generation unit adapted to generate color information for an element configuring three-dimensional shape data for identifying a three-dimensional shape of an object based on the virtual viewpoint information and a plurality of images based on image capturing of a plurality of imaging devices; and an output unit adapted to output the three-dimensional shape data and the color information.

In the following, with reference to the drawings, embodiments suitable to the present disclosure are explained in detail. The following embodiments are not intended to limit the present disclosure and all combinations of features explained in the present embodiments are not necessarily indispensable to the solution of the present disclosure. In the present specification, the virtual viewpoint image is an image that is generated by a user and/or a dedicated operator freely operating the position and orientation of a virtual camera in an image capturing space and is also called a free-viewpoint image, an arbitrary viewpoint image and the like. In this case, the virtual camera means a virtual imaging device that does not exist actually in the image capturing space and is distinguished from an imaging device (real camera) that exists actually in the image capturing space. Further, unless stated particularly, explanation is given on the assumption that the word "image" includes the concepts of both moving image and still image.

First Embodiment

In the present embodiment, an aspect is explained in which a server generates a dataset including shape information and color information on an object by using images (multi-viewpoint images) captured by a plurality of real cameras and a client terminal receives the dataset and generates and outputs a virtual viewpoint image. A three-dimensional CG (Computer Graphic) model of an object is constructed by a dataset identifying the shape and color, and therefore, this dataset is called "model data".

<Hardware Configuration of System>

Figure 1A:
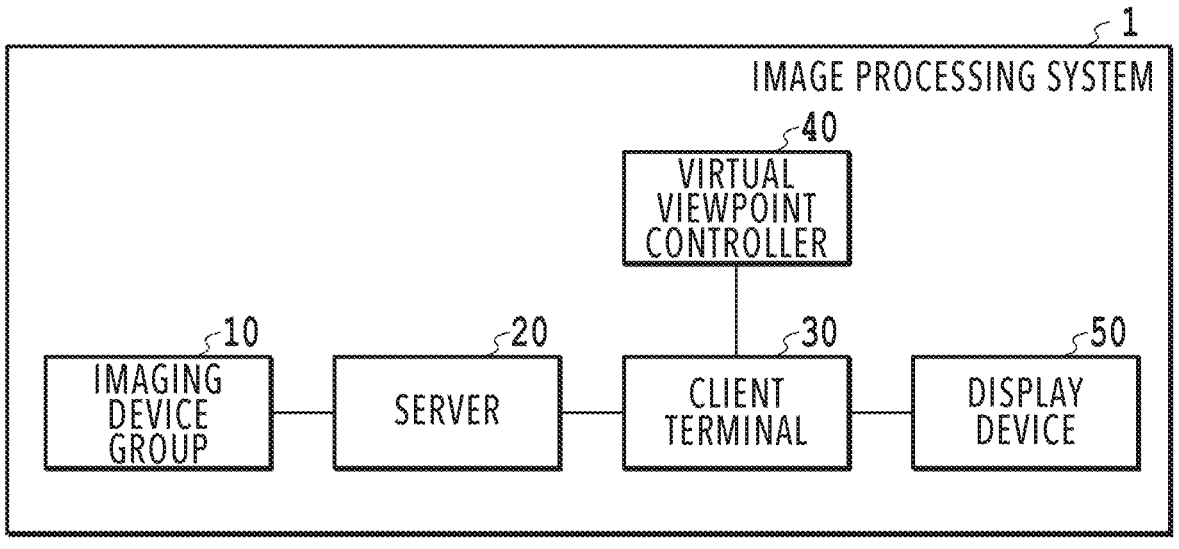
FIG. 1A is a diagram showing one example of a whole configuration of an image processing system according to a first embodiment and FIG. 1B is a block diagram showing a hardware configuration example of an information processing apparatus.

FIG. 1A is a diagram showing one example of the whole configuration of an image processing system according to the present embodiment. An image processing system 1 has an imaging device group 10, a server 20, a client terminal 30, a virtual viewpoint controller 40, and a display device 50.

The imaging device group 10 includes a plurality of imaging devices (real cameras) arranged around an object and performs synchronous image capturing for the object from different viewpoints. Then, captured images corresponding to a plurality of viewpoints (in the following, described as "multi-viewpoint images"), which are obtained by the synchronous image capturing, extrinsic/intrinsic parameters of each real camera configuring the imaging device group 10, and the like are transmitted to the server 20. Here, the extrinsic parameters refer to parameters indicating the position and orientation of the imaging device (for example, rotation matrix, position vector and the like). The intrinsic parameters refer to parameters indicating the characteristics of the optical system specific to the imaging device, for example, such as the focal length, the image center, and the lens distortion. In the following explanation, the extrinsic parameters and the intrinsic parameters of the imaging device are called together "camera parameters".

The server 20 generates shape information and color information on an object to be taken as a foreground (in the following, described as "foreground object") based on the multi-viewpoint images and the camera parameters of each real camera, which are received from the imaging device group 10, and outputs the shape information and color information to the client terminal 30. The object to be taken as a foreground is a moving body existing within the image capturing range of the imaging device group 10, for example, such as a player and a ball in a case of the game of soccer. First, the server 20 generates three-dimensional shape data (shape information or geometry information) of the foreground object based on the multi-viewpoint images and the camera parameters of each real camera. For the generation of shape information, for example, the visual hull method is used. Due to this, shape information representing the three-dimensional shape of the foreground object by a point cloud (set of points having three-dimensional coordinates) is obtained. The representation format of shape information is not limited to the point cloud and it may also be possible to use meshes and voxels as the unit element identifying the shape. Further, the server 20 generates color information on the foreground object based on the shape information on the foreground object, the multi-viewpoint images, the camera parameters of each real camera, and the camera parameters of the virtual camera. In this case, for the range that is viewed from the virtual camera, color information depending on the virtual viewpoint (in the following, described as "virtual viewpoint-dependent color information") is generated and for the range that is not viewed from the virtual camera, color information not depending on the virtual viewpoint (in the following, described as "virtual viewpoint-independent color information") is generated. Specifically, based on information on the position, the line-of-sight direction, and the viewing angle of the virtual camera (virtual viewpoint), only for the portion of the three-dimensional shape represented by the shape information, which is viewed from the virtual viewpoint, the color thereof is determined by using the captured image of the real camera whose line-of-sight direction is close to that of the virtual viewpoint. The captured image that is used to determine the virtual viewpoint-dependent color information is selected depending on the position and orientation of the virtual camera, and therefore, in a case where the virtual camera moves or the orientation of the virtual camera changes, the color changes in accordance therewith. On the other hand, the virtual viewpoint-independent color information is color information whose color does not change even in a case where the virtual camera moves or the orientation of the virtual camera changes. While it is possible for the virtual viewpoint-dependent color information to reproduce the color of an object, which is closer to the color in the real world in a case where the object is viewed from the virtual viewpoint, the generation process thereof requires a tremendous number of multi-viewpoint images. Because of this, in a case where the virtual viewpoint-dependent color information is generated at the client terminal 30, it is necessary to receive a large amount of multi-viewpoint image data from the server 20. Further, it is also necessary to determine a color for each unit element of the shape information (in a case of the point cloud format, for ach point) based on the received large amount of multi-viewpoint image data, and therefore, the load of the arithmetic processing at the client terminal 30 also increases. Consequently, in the present embodiment, by limiting the generation of virtual viewpoint-dependent color information, an increase in the load of data transfer and arithmetic processing in the server-client system is suppressed.

The client terminal 30 generates information (virtual viewpoint information) including camera parameters, such as the position, orientation, and viewing angle, for identifying the virtual camera (virtual viewpoint) based on an input signal (operation signal of a user) from the virtual viewpoint controller 40, to be described later. Then, the client terminal 30 outputs the generated virtual viewpoint information to the server 20. The camera parameters included in the virtual viewpoint information may include another parameter, such as the size (width and height) of a virtual viewpoint image to be generated. Further, the client terminal 30 generates a virtual viewpoint image by using model data of the foreground object received from the server 20 and the generated virtual viewpoint information. The generation method of a virtual viewpoint image will be described later. Further, the client terminal 30 outputs data of the generated virtual viewpoint image to the display device 50.

The virtual viewpoint controller 40 is a viewpoint input device for a user to designate the position, orientation and the like of the virtual camera. The virtual viewpoint controller 40 has a joystick, jog dial, touch panel, keyboard, mouse and the like and a user designates the position, orientation, viewing angle and the like of the virtual camera by operating those. The operation signal of a user, which designates the camera parameters relating to the virtual camera, is transmitted to the client terminal 30.

The display device 50 receives virtual viewpoint image data from the client terminal 30 and displays it. It is possible for a user to designate the position, orientation and the like of the next virtual camera by operating the virtual viewpoint controller 40 while viewing the virtual viewpoint image displayed on the display device 50.

The above is the outline of each device configuring the image processing system 1. The number of client terminals 30 connected to the server 20 is not limited to one and a plurality of the client terminals 30 may be connected to the server 20. In a case where a plurality of the client terminals 30 is connected, all of the client terminals 30 may have the virtual viewpoint controller 40, or part of the client terminals 30 may not have the virtual viewpoint controller 40. It is sufficient to transmit the model data to be sent to the client terminal 30 not having the virtual viewpoint controller 40 by including the virtual viewpoint information generated by another client terminal or the server in the model data, as will be explained in the second embodiment.

<Hardware Configuration of Information Processing Apparatus>

Figure 1B:
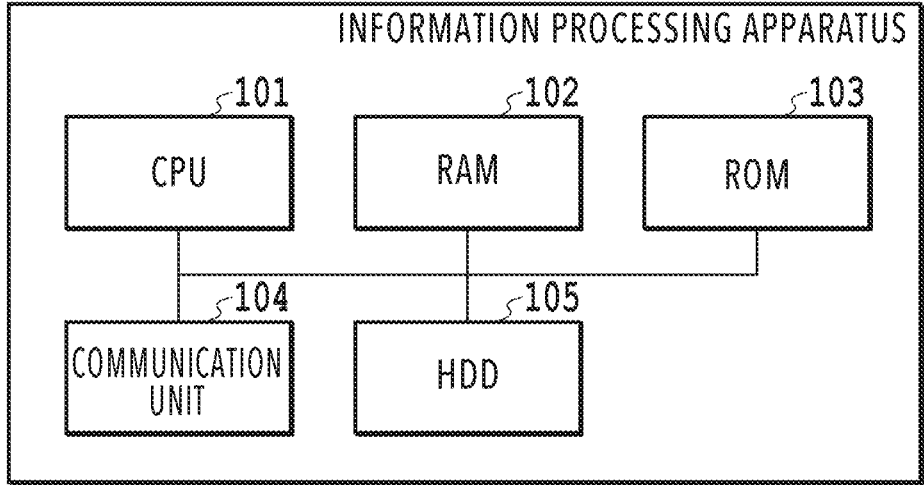

FIG. 1B is a diagram showing one example of the hardware configuration of a general information processing apparatus implementing the above-described server 20 and the client terminal 30. As shown in FIG. 1B, the information processing apparatus has a CPU 101, a RAM 102, a ROM 103, and a communication unit 104.

The CPU 101 is a processor that executes programs stored in the ROM 103 by using the RAM 102 as a work memory and comprehensively controls each unit of the information processing apparatus. The function of each processing unit shown in FIG. 2, to be described later, is implemented by the CPU 101 executing various programs. The RAM 102 temporarily stores computer programs read from the ROM 103, results during arithmetic processing and the like. The ROM 103 stores computer programs, such as OS, which do not need to be changed, and data, such as setting values. The communication unit 104 is a communication interface compliant with the communication standard, such as Ethernet and USB, and performs transmission and reception of data with an external device. The HDD 105 is a large-capacity storage device and stores captured image data, data of a three-dimensional CG model of an object to be taken as a background (in the following, described as "background object"), and the like.

<Function Configuration of Information Processing Apparatus>

Figure 2:
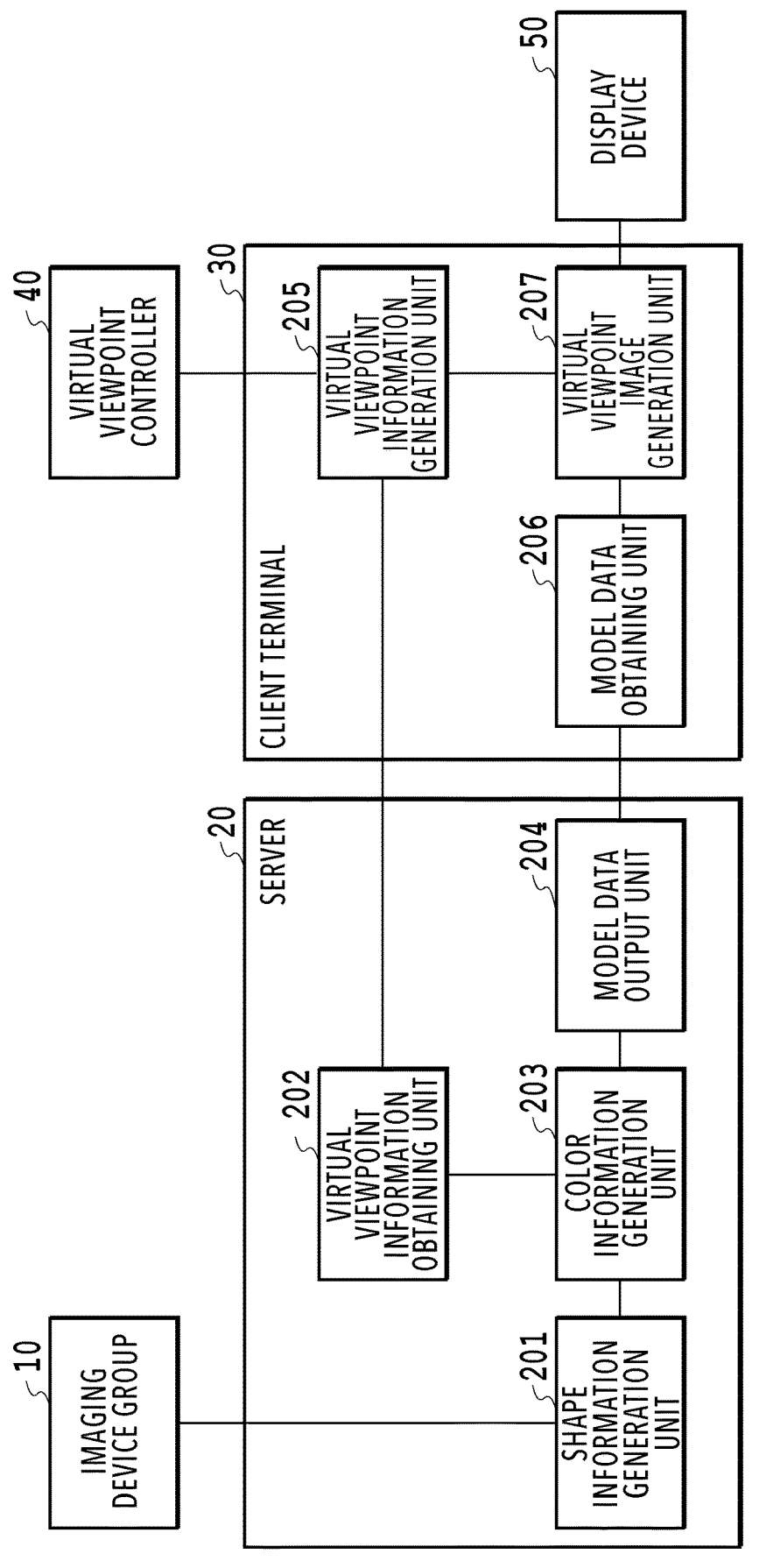
FIG. 2 is a block diagram showing one example of a function configuration of a server and a client terminal according to the first embodiment.

FIG. 2 is a diagram showing one example of the function configuration of the server 20 and the client terminal 30 according to the present embodiment.

<<Function Configuration of Server>

The server 20 has a shape information generation unit 201, a virtual viewpoint information obtaining unit 202, a color information generation unit 203, and a model data output unit 204 as processing units for generating virtual viewpoint-dependent model data and providing the model data to the client terminal 30. In the following, each processing unit configuring the server 20 is explained.

The shape information generation unit 201 generates shape information on the foreground object by using the multi-viewpoint images and the camera parameters of each real camera, which are received from the imaging device group 10. The generated shape information is output to the color information generation unit 203 along with the data of the multi-viewpoint images used for the generation thereof.

The virtual viewpoint information obtaining unit 202 receives and obtains virtual viewpoint information that is sent from the client terminal 30. The obtained virtual viewpoint information is output to the color information generation unit 203.

The color information generation unit 203 generates color information on the foreground object based on the shape information on the foreground object and the multi-viewpoint images, which are input from the shape information generation unit 201, and the virtual viewpoint information input from the virtual viewpoint information obtaining unit 202. The generated color information is output to the model data output unit 204 along with the corresponding shape information.

The model data output unit 204 transmits and outputs the model data, which is a dataset of the shape information and the color information both input from the color information generation unit 203, to a predetermined output destination (in the present embodiment, the client terminal 30) via the communication unit 104.

<<Function Configuration of Client Terminal>

The client terminal 30 has a virtual viewpoint information generation unit 205, a model data obtaining unit 206, and a virtual viewpoint image generation unit 207 as processing units for generating a virtual viewpoint image. In the following, each processing unit configuring the client terminal 30 is explained.

The virtual viewpoint information generation unit 205 generates virtual viewpoint information based on the operation signal input from the virtual viewpoint controller 40. In the following, one example of virtual viewpoint information is shown.

<<Virtual Viewpoint Information>

```
{
    "position":[100, 0, 0],
    "rotation":[0.5, -0.5, 0.5, -0.5],
    "field of view":30,
    "width":1920,
    "height":1080
}
```

In the above-described virtual viewpoint information, "position" indicates the position of the virtual camera, "rotation" indicates the orientation of the virtual camera, and "field of view" indicates the viewing angle of the virtual camera. Further, "width" and "height" indicate the width and height of an output image (virtual viewpoint image), respectively. The virtual viewpoint information shown here is only one example and the virtual viewpoint information may further include information, for example, such as a view port and a clipping surface. The generated virtual viewpoint information is transmitted to the server 20 in accordance with, for example, the frame rate of the display device 50, as well as being output to the virtual viewpoint image generation unit 207. In a case where the virtual viewpoint image is displayed at 60 FPS on the display device 50, the virtual viewpoint information is transmitted and output to the server 20 at intervals of about 16.6 msec. It is not necessarily required for the frame rate of the display device 50 and the output interval of the virtual viewpoint information to be the same.

The model data obtaining unit 206 receives the model data transmitted from the model data output unit 204 of the server 20 and outputs the model data to the virtual viewpoint image generation unit 207.

The virtual viewpoint image generation unit 207 generates a virtual viewpoint image by performing rendering processing based on the input model data of the foreground object, the three-dimensional CG model of the background object (in the following, described as "background model"), which is prepared in advance, and the virtual viewpoint information relating to the designation of a user. Specifically, the three-dimensional CG model based on the model data of the foreground object (in the following, described as "foreground model"), the background model read from the HDD 105, and the virtual camera indicated by the virtual viewpoint information are arranged respectively on the virtual space and projected onto the image coordinate system of the virtual camera. Due to this, a virtual viewpoint image representing the appearance from the virtual camera is obtained. The data of the generated virtual viewpoint image is sent to the display device 50 and displayed on the display screen.

<Way of Thinking of the Present Embodiment>

In a case of a virtual viewpoint image, which is a moving image, in order to give a user a great feeling of being at a live performance, it is desirable for each frame to be of high image quality and for the frame rate to be high (frame rate at which the movement of the images is smooth, for example, 60 fps). However, for example, in a case where virtual viewpoint-dependent color information is generated and appended at the client terminal in the server-client system, an increase in the amount of data to be transmitted and the amount of arithmetic processing will result as described previously. In a case where it is attempted to view a virtual viewpoint image of high image quality in an environment in which the transmission band is narrow or at the client terminal whose processing performance is poor, there is a possibility that the frame rate is reduced. Because of this, by generating virtual viewpoint-dependent color information in the server and transmitting the color information to the client terminal and by the client terminal performing coloring processing based on the received color information, it is made possible to generate and display a virtual viewpoint image of high image quality while lightening the processing load in the transmission band and at the client terminal.

Figure 3:
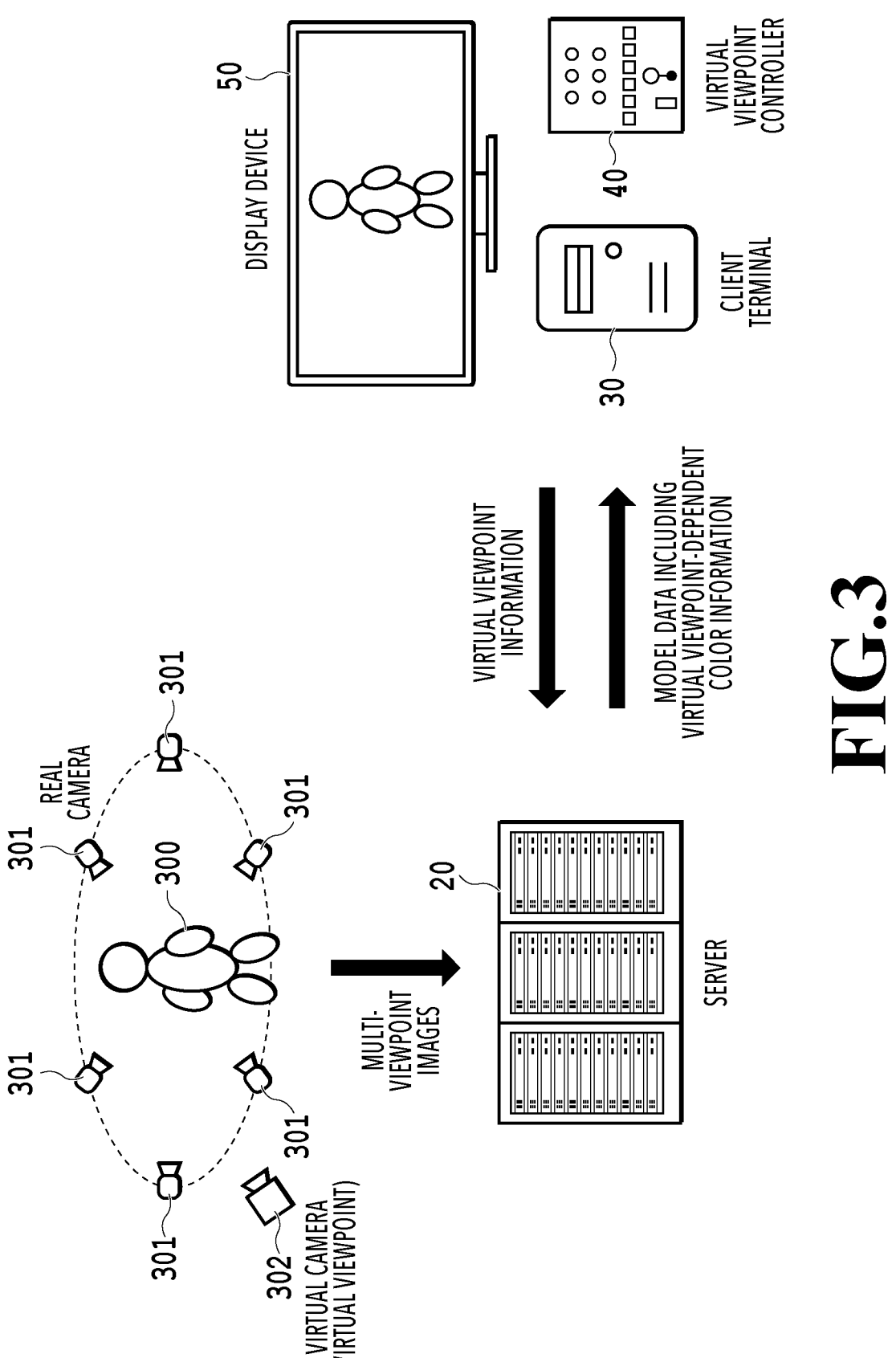
FIG. 3 is a diagram showing an outline until a virtual viewpoint image is generated and displayed according to the first embodiment.

The generation and transmission of model data including virtual viewpoint-dependent color information in the server and further, the generation of a virtual viewpoint image using the model data at the client terminal in the image processing system 1 of the present embodiment are explained with reference to the drawings. FIG. 3 is a diagram showing an outline until a virtual viewpoint image based on multi-viewpoint images is generated and displayed by taking a person 300 as a foreground object as a target according to the present embodiment. Real cameras 301 configuring the imaging device group 10 each capture the person 300 from different viewpoints and transmit the obtained multi-viewpoint images to the server 20. In a case where a user designates the position and orientation of a virtual camera 302 by operating the virtual viewpoint controller 40, an operation signal thereof is input to the client terminal 30. The client terminal 30 generates camera parameters of the virtual camera 302 from the input operation signal and transmits the camera parameters to the server 20 as virtual viewpoint information. The server 20 generates model data including shape information and color information on the foreground object based on the multi-viewpoint images and the virtual viewpoint parameters, both of which are received. Then, the server 20 transmits the generated model data to the client terminal 30. The client terminal 30 generates a virtual viewpoint image based on the received model data and the generated virtual viewpoint parameters and displays and outputs the virtual viewpoint image on the display device 50. By performing the processing as described above, even in a case where the amount of data of multi-viewpoint images increases due to the increase in the number of real cameras 301 capturing the person 300, the amount of data that is transmitted between the server 20 and the client terminal 30 does not increase.

Generally, the larger the number of real cameras 301 capturing the person 300, the more accurately it is possible to generate color information on the person 300. The reason is that the installation density of the real cameras 301 increases, and therefore, it is possible to use more captured images of the real cameras 301 whose position and orientation are close to the position and line of sight of the virtual camera set within the virtual space in a case of the generation of color information. As a result of that, it is made possible to obtain a virtual viewpoint image of higher image quality. However, in a case where it is attempted to obtain virtual viewpoint-dependent color information for the foreground object at the client terminal 30, it is necessary to send data of multi-viewpoint images to the client terminal 30 from the server 20 (or from the imaging device group 10). In a case where the real cameras 301 increase in number and the amount of data of multi-viewpoint images increases considerably, the transmission band of the server 20 and the client terminal 30 enters a state of reaching its limit, and therefore, a transmission error occurs. Consequently, in the present embodiment, in the server 20, not only shape information relating to the foreground object but also virtual viewpoint-dependent color information is generated and they are provided to the client terminal 30 as model data. Then, the client terminal 30 generates a virtual viewpoint image based on the received model data. By doing so, it is possible to transmit and receive data necessary for the generation of a virtual viewpoint image without reducing the frame rate even in an environment in which the transmission band is narrow, and therefore, it is made possible for a user to view a virtual viewpoint image of high image quality.

<Generation and Transmission of Model Data>

Figure 4:
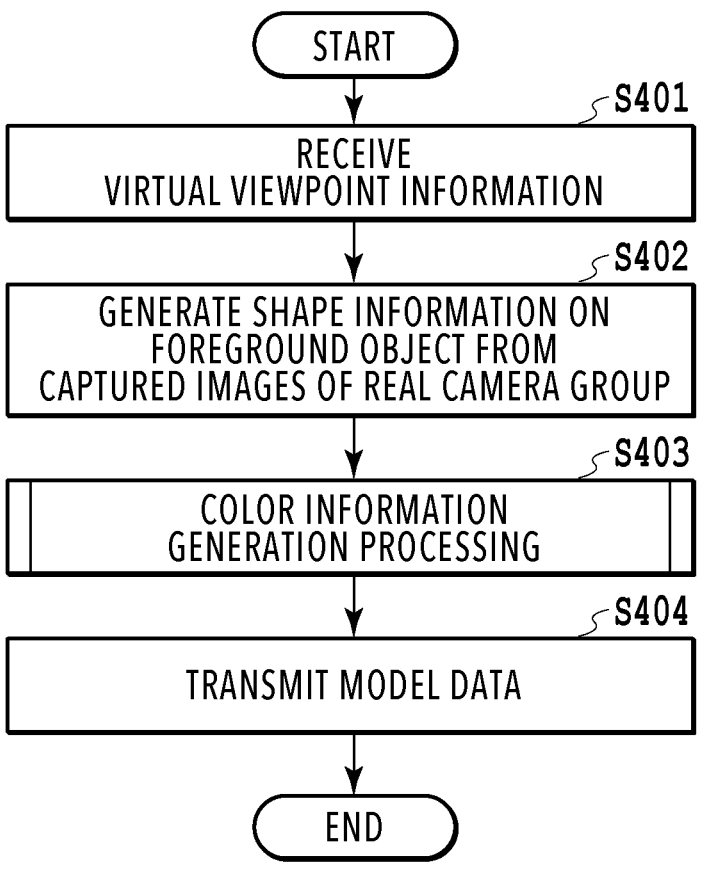
FIG. 4 is a flowchart showing a rough flow of processing to control the generation and transmission of model data of a foreground object in the sever according to the first embodiment.

FIG. 4 is a flowchart showing a rough flow of processing to control the generation and transmission of model data of a foreground object in the server 20 according to the present embodiment. The flow shown in FIG. 4 is implemented by the CPU 101 reading a control program stored in the ROM 103 or the HDD 105 onto the RAM 102 and executing the control program. The start of the execution of the flow in FIG. 4 is triggered by the shape information generation unit 201 receiving multi-viewpoint image data from the imaging device group 10.

At S401, the virtual viewpoint information obtaining unit 202 receives virtual viewpoint information from the client terminal 30. The received virtual viewpoint information is sent to the color information generation unit 203.

At S402, the shape information generation unit 201 generates shape information on the foreground object based on the multi-viewpoint image data. The generated shape information is sent to the color information generation unit 203 along with the input multi-viewpoint image data.

Figure 5A:
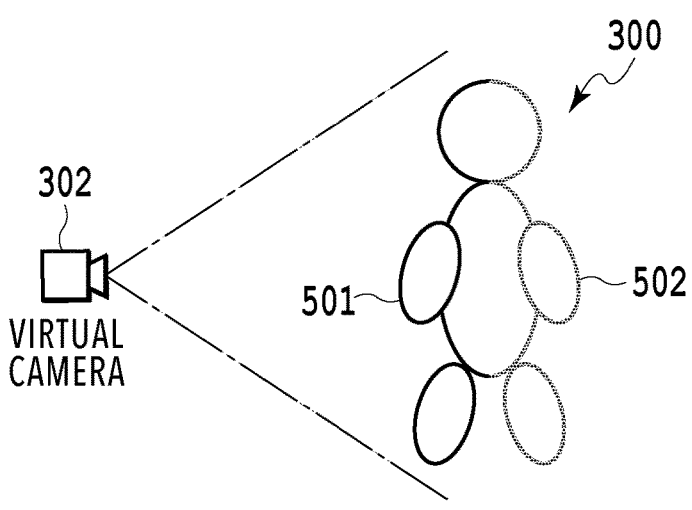
FIG. 5A and FIG. 5B are each a diagram explaining how color information is generated for a foreground object.
Figure 5B:
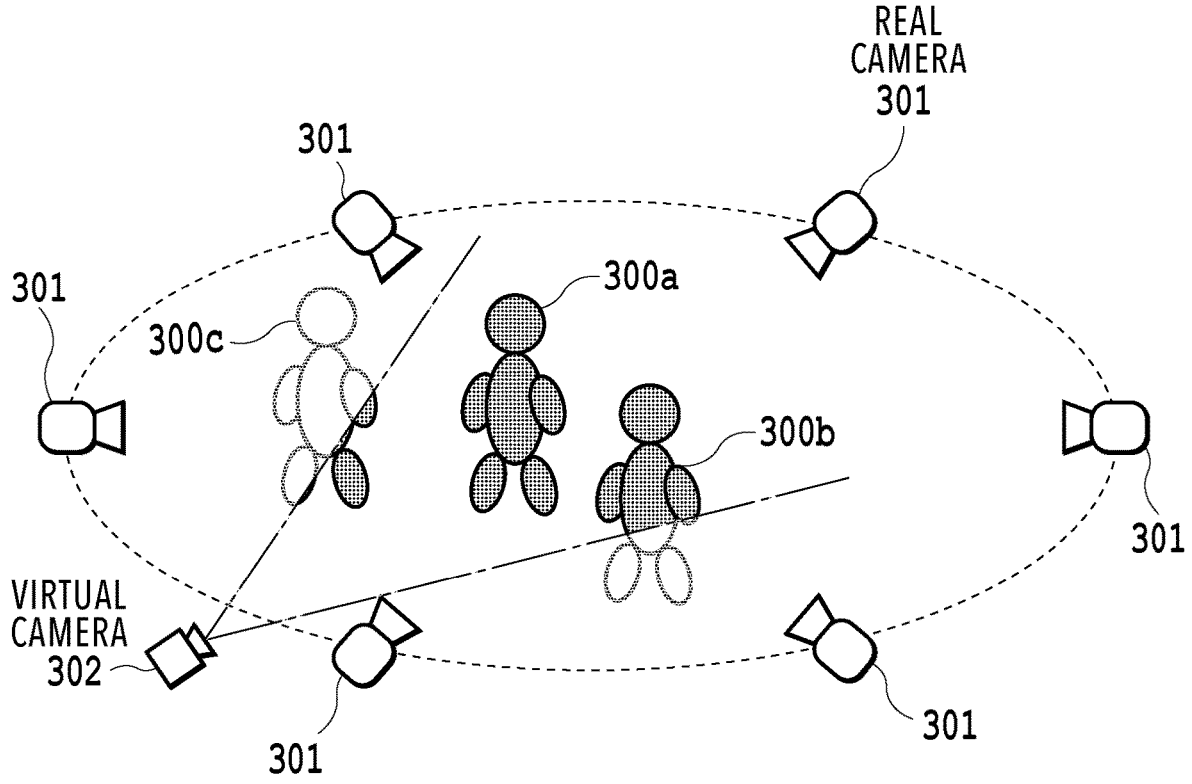

At S403, the color information generation unit 203 generates color information on the foreground object based on the shape information on the foreground object and the multi-viewpoint image data, both of which are input from the shape information generation unit 201, and the virtual viewpoint information input from the virtual viewpoint information obtaining unit 202. In the present embodiment, among elements configuring the three-dimensional shape data of the foreground object, for the element corresponding to the partial area displayed in the virtual viewpoint image representing the appearance from the virtual viewpoint, virtual viewpoint-dependent color information is generated. In more detail, for each individual "point", which is the unit element of the shape information, in a case where the point is located on the obverse side viewed from the virtual camera and within the viewing angle of the virtual camera, virtual viewpoint-dependent color information is generated and in the other cases, virtual viewpoint-independent color information is generated. FIG. 5A and FIG. 5B are each a diagram explaining how color information on a person as a foreground object is generated in the present embodiment. FIG. 5A is a diagram explaining the determination of whether the target point is located on the obverse side or the reverse side in a case of being viewed from the virtual camera, which is a first condition for generating virtual viewpoint-dependent color information. In FIG. 5A, the side (obverse side) at which the person 300 is viewed in the line-of-sight direction of the virtual camera 302 is indicated by a thick contour 501 and the side at which the person 300 is not viewed is indicated by a thin contour 502. In this case, among each point configuring the point cloud indicated by the shape information on the person 300, the point belonging to the obverse side satisfies the first condition. Then, FIG. 5B is a diagram explaining the determination of whether the target point is located inside or outside the viewing angle of the virtual camera, which is a second condition for generating virtual viewpoint-dependent color information. In FIG. 5B, within the image capturing space, three persons 300a to 300c exist and the full body of the person 300a is included within the viewing angle of the virtual camera 302 and the upper half body of the person 300b and part of the leg and hand of the person 300c are included within the viewing angle of the virtual camera 302. In this case, the point of each portion included within the viewing angle among the point cloud representing the shape of each of the persons 300a to 300c satisfies the second condition. The reason the virtual viewpoint-independent color information is generated also for the point of the portion belonging to the range not viewed from the virtual camera is that, for example, there is a case where a material including reflection is set to the background 3D model in the generation of a virtual viewpoint image and this is taken into consideration. Due to this, it is possible to reproduce a reflection or the like using color information on the foreground model not viewed from the virtual camera. A specific processing procedure of color information generation processing will be described later. The color information generated at this step is sent to the model data output unit 204 along with the shape information used for the generation thereof.

At S404, the model data output unit 204 associates the shape information and the color information with each other, both of which are received from the color information generation unit 203, and transmits and outputs the associated information to the client terminal 30 as model data.

The above is the contents of the processing to control the generation and transmission of the model data of the foreground object in the server 20. In the present embodiment, the color information is generated after the shape information is generated, but for example, it may also be possible to perform the generation of the shape information and the generation of the color information in parallel.

<Details of Color Information Generation Processing>

Figure 6:
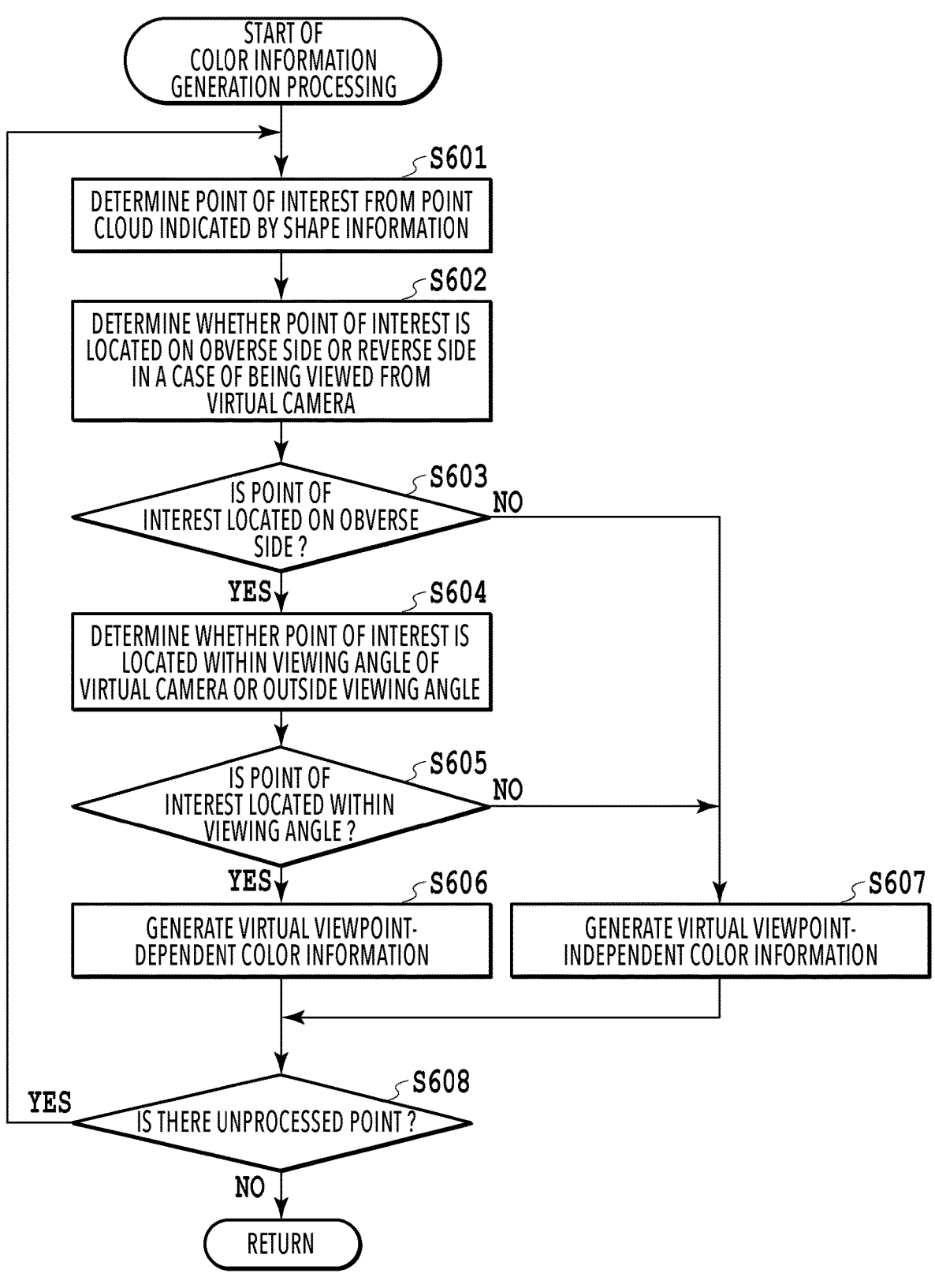
FIG. 6 is a flowchart showing details of color information generation processing according to the first embodiment.

FIG. 6 is a flowchart showing details of the color information generation processing at S403 according to the present embodiment. The flow in FIG. 6 is performed for each piece of shape information in a case where a plurality of foreground objects is captured in the multi-viewpoint images and a plurality of pieces of shape information corresponding thereto is input. In the following, along the flow in FIG. 6, a specific processing procedure of color information generation processing is explained.

At S601, the processing-target unit element represented by the shape information, in a case of the present embodiment, a "point" of interest among "points" configuring the point cloud is determined.

At S602, whether the point of interest is located on the obverse side or the reverse side in a case of being viewed from the virtual camera is determined. Specifically, whether the point of interest belongs to the obverse side or the reverse side is determined by performing visibility determination for the point of interest. In this visibility determination, a real camera capable of capturing the point of interest is identified and the presence/absence of visibility is determined by determining whether the line-of-sight direction of the identified real camera and the line-of-sight direction of the virtual camera are opposite. In a case where the inner product of the line-of-sight vector of the real camera and the line-of-sight vector of the virtual camera is less than or equal to "0", it is determined that the point of interest is located on the reverse side of the foreground object in a case of being viewed from the virtual camera. That is, in a case where the line-of-sight direction of the real camera and the line-of-sight direction of the virtual camera are not opposite, it is determined that the point of interest belongs to the obverse side and in a case where they are opposite, it is determined that the point of interest belongs to the reverse side. The method of visibility determination is not limited to this. For example, it may also be possible to project the point cloud onto the camera coordinate system of the virtual camera and determine that the point located within a predetermined distance (that is, the point belonging to the obverse side in the depth map) is located on the obverse side. Alternatively, it may also be possible to obtain the normal direction for each point from the positional relationship of each point configuring the point cloud and perform the determination based on the obtained normal direction. For example, it may also be possible to find a plane by using a plurality of points in the vicinity of the point of interest, calculate the normal vector of the plane, and perform the determination in accordance with the inner product of the calculated normal vector and the line-of-sight vector of the virtual camera.

At S603, the next processing is allocated in accordance with the determination results at S602. In a case where it is determined that the point of interest is located on the obverse side, the processing advances to S604 and in a case where it is determined that the point of interest is located on the reverse side, the processing advances to S607.

At S604, whether the point of interest is located within the viewing angle of the virtual camera or outside the viewing angle is determined. Specifically, the point of interest is projected onto the camera coordinate system of the virtual camera and in a case where the point of interest exists within the range of the image viewed from the virtual camera, it is determined that the point of interest exists within the viewing angle of the virtual camera and in a case where the point of interest does not exist therewithin, it is determined that the point of interest exists outside the viewing angle.

At S605, the next processing is allocated in accordance with the determination results at S604. In a case where it is determined that the point of interest exists within the viewing angle of the virtual camera, the processing advances to S606 and in a case where it is determined that the point of interest exists outside the viewing angle, the processing advances to S607.

At S606, virtual viewpoint-dependent color information is generated for the point of interest. The virtual viewpoint-dependent color information is generated by processing in two stages, that is, visibility determination processing for the point of interest and color derivation processing based on the position and orientation of the virtual camera. First, by the visibility determination processing, from the positional relationship between the point of interest and the plurality of real cameras included in the imaging device group 10, the real camera capable of capturing the point of interest is identified. Next, in the color derivation processing, from among the identified real cameras, the real camera having the line-of-sight direction relatively close to the line-of-sight direction of the virtual camera is selected and the point of interest is projected onto the captured image of the selected real camera. Then, the color value (for example, RGB values) of the pixel at the projection destination is determined as the color value of the point of interest. Here, in a case where the real camera is selected, it is sufficient to find the angle formed by the line-of-sight direction from the virtual camera to the point of interest and the line-of-sight direction from each real camera to the point of interest and select the real camera whose formed angle is less than or equal to a predetermined angle. In a case where it is possible to capture the point of interest by a plurality of real cameras, it may also be possible to project the point of interest onto each of the captured images of the plurality of real cameras having the line-of-sight direction close to the line-of-sight direction of the virtual camera, obtain the color values of the pixels at the projection destination, and determine the average value of the obtained color values as the color value of the point of interest.

At S607, virtual viewpoint-independent color information is generated for the point of interest. The virtual viewpoint-independent color information is generated by processing in two stage, that is, the above-described visibility determination processing and color derivation processing not based on the position and orientation of the virtual camera. After the above-described visibility determination processing, the point of interest is projected onto the captured image of the real camera capable of capturing the point of interest and the color value of the pixel at the projection destination is determined as the color value of the point of interest. In a case where it is possible to capture the point of interest by a plurality of real cameras, it may also be possible to project the point of interest onto each of the captured images of the plurality of real cameras, obtain the color values of the pixels at the projection destination, and determine the average value of the obtained color values as the color value of the point of interest. Further, in this case, the point of interest is not viewed from the virtual camera, and therefore, it may also be possible to fill the point of interest with a single color (for example, black). The above is the contents of the color information generation processing according to the present embodiment.

<Generation of Virtual Viewpoint Image>

Figure 7:
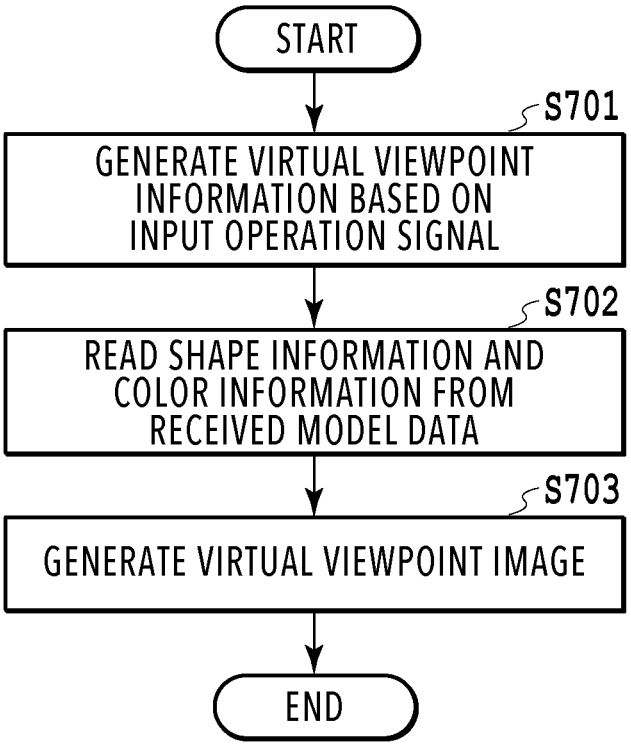
FIG. 7 is a flowchart showing a flow of processing to generate a virtual viewpoint image using model data at the client terminal according to the first embodiment.

FIG. 7 is a flowchart showing a flow of generation processing of a virtual viewpoint image using model data at the client terminal 30 according to the present embodiment. The execution of the flow in FIG. 7 is started in response to the reception of the operation signal from the virtual viewpoint controller 40.

At S701, the virtual viewpoint information generation unit 205 generates virtual viewpoint information based on the operation signal received from the virtual viewpoint controller 40. The generated virtual viewpoint information is sent to the virtual viewpoint image generation unit 207. Further, as described previously, the virtual viewpoint information generated here is transmitted also to the server 20.

At S702, the model data obtaining unit 206 receives model data from the server 20 and reads shape information and color information from the received model data. The read shape information and color information are sent to the virtual viewpoint image generation unit 207.

At S703, the virtual viewpoint image generation unit 207 generates a virtual viewpoint image based on the virtual viewpoint information input from the virtual viewpoint information generation unit 205 and the shape information and color information input from the model data obtaining unit 206. The data of the generated virtual viewpoint image is transmitted to the display device 50 and displayed by the display device 50.

The above is the contents of the generation processing of a virtual viewpoint image at the client terminal 30.

Modification Example 1

In the present embodiment, for the "point" in the range that is not viewed from the virtual camera among the point cloud represented by the shape information, the virtual viewpoint-independent color information is generated, but this is not limited. For example, for the "point" in the range that is not viewed from the virtual camera, it may also be possible not to perform the generation of color information but perform processing to delete the "point" from the shape information. Due to this, the shape information and color information no longer exist at all for the portion of the shape of the foreground object, which is not viewed from the virtual camera, and therefore, it is possible to more suppress the amount of data that is transmitted between devices.

Modification Example 2

In the present embodiment, the model data that is generated by the server includes virtual viewpoint-dependent color information without fail, but this is not limited. For example, in a case where it is predicted that the number of client terminals increases and the processing performance of the server and the capacity of the transmission band are exceeded, it may also be possible to generate model data including virtual viewpoint-independent color information for part of the client terminals and transmit it to them. The color information in this case does not depend on the position or orientation of the virtual camera and it is only necessary to generate model data common to the plurality of client terminals once, and therefore, it is possible to suppress an increase in the processing load of the server even the number of client terminals increases. Further, it may also be possible for the server to determine virtual viewpoint-dependent color information or virtual viewpoint-independent color information in accordance with the use at each of the client terminals and selectively generate and transmit model data. For example, for the client terminal that generates a virtual viewpoint image in which the foreground model is decorated with flamboyant particle effects, color information of high accuracy is not necessary. Consequently, for the client terminal whose use is such as this, it may also be possible to transmit model data including virtual viewpoint-independent color information. Due to the present modification example, it is possible to more suppress the amount of data that is transmitted between devices.

As explained above, in the present embodiment, the server 20 generates model data including virtual viewpoint-dependent color information and transmits it to the client terminal 30, and the client terminal 30 performs processing to generate a virtual viewpoint image. Due to this, it is made possible to generate a virtual viewpoint image of high image quality without reducing the frame rate even in the environment in which the band through which model data is transmitted is narrow and at the client terminal whose processing performance is low.

Second Embodiment

The first embodiment is an aspect in which the client terminal generates virtual viewpoint information and provides it to the server, and the server generates model data including virtual viewpoint-dependent color information and provides it to the client terminal. Next, an aspect is explained as the second embodiment in which the server generates virtual viewpoint information and generates model data including virtual viewpoint-dependent color information based on the generated virtual viewpoint information, and provides the model data to the client terminal. Explanation is given by omitting or simplifying explanation of the portions common to those of the first embodiment.

<Hardware Configuration of System>

Figure 8:
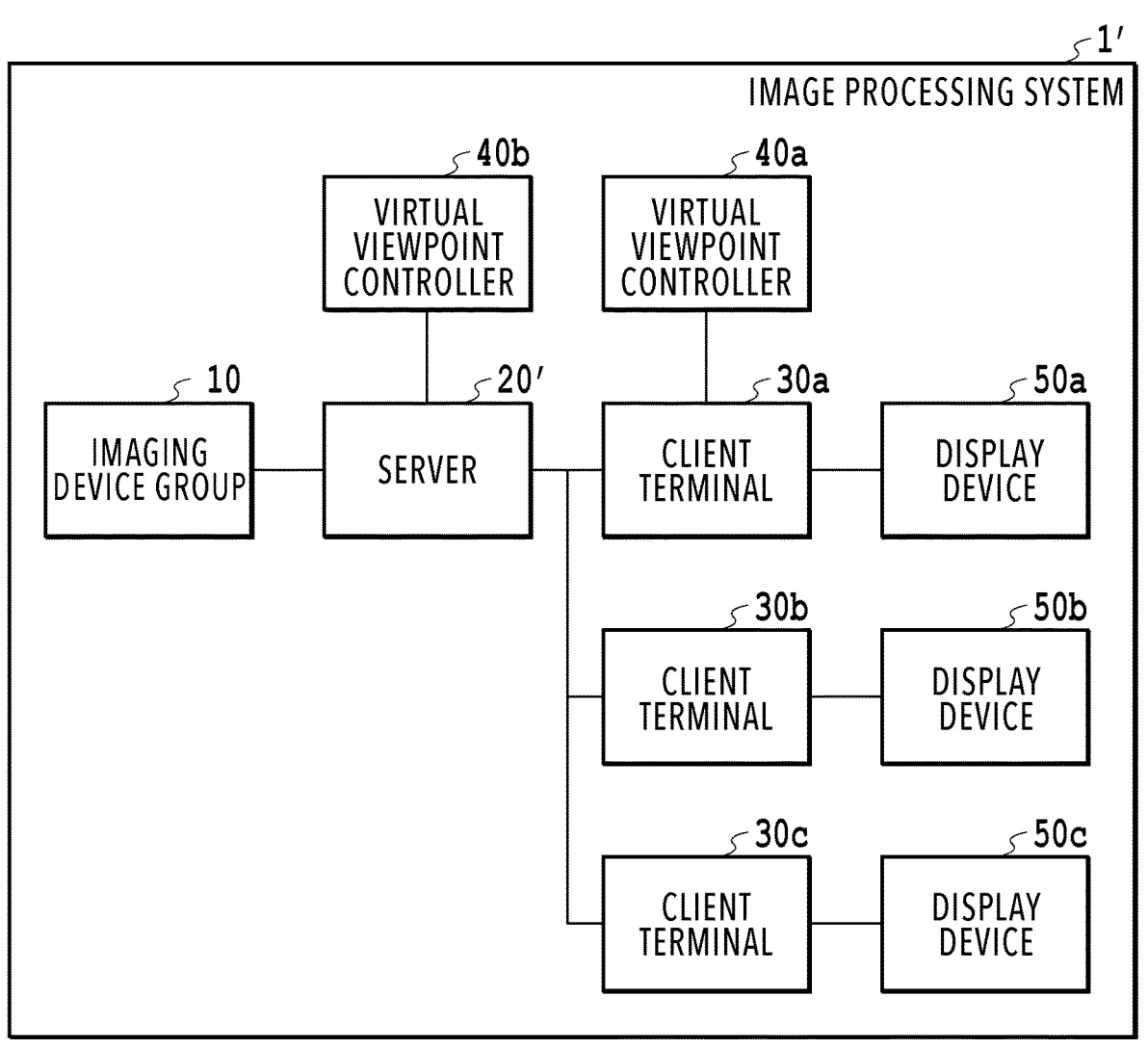
FIG. 8 is a diagram showing one example of a whole configuration of an image processing system according to a second embodiment.

FIG. 8 is a diagram showing one example of the whole configuration of an image processing system according to the present embodiment. An image processing system 1' has the imaging device group 10, a server 20', client terminals 30a to 30c, virtual viewpoint controllers 40a and 40b, and display devices 50a to 50c. There are two large differences from the image processing system 1 according to the first embodiment. One difference lies in that the virtual viewpoint controller 40b for the server 20' is prepared separately from the virtual viewpoint controller 40a for the client terminal 30. The other lies in that the client terminals 30b and 30c to which the virtual viewpoint controller 40a is not connected exist separately from the client terminal 30a to which the virtual viewpoint controller 40a is connected.

<Function Configuration of Information Processing Apparatus>

Figure 9:
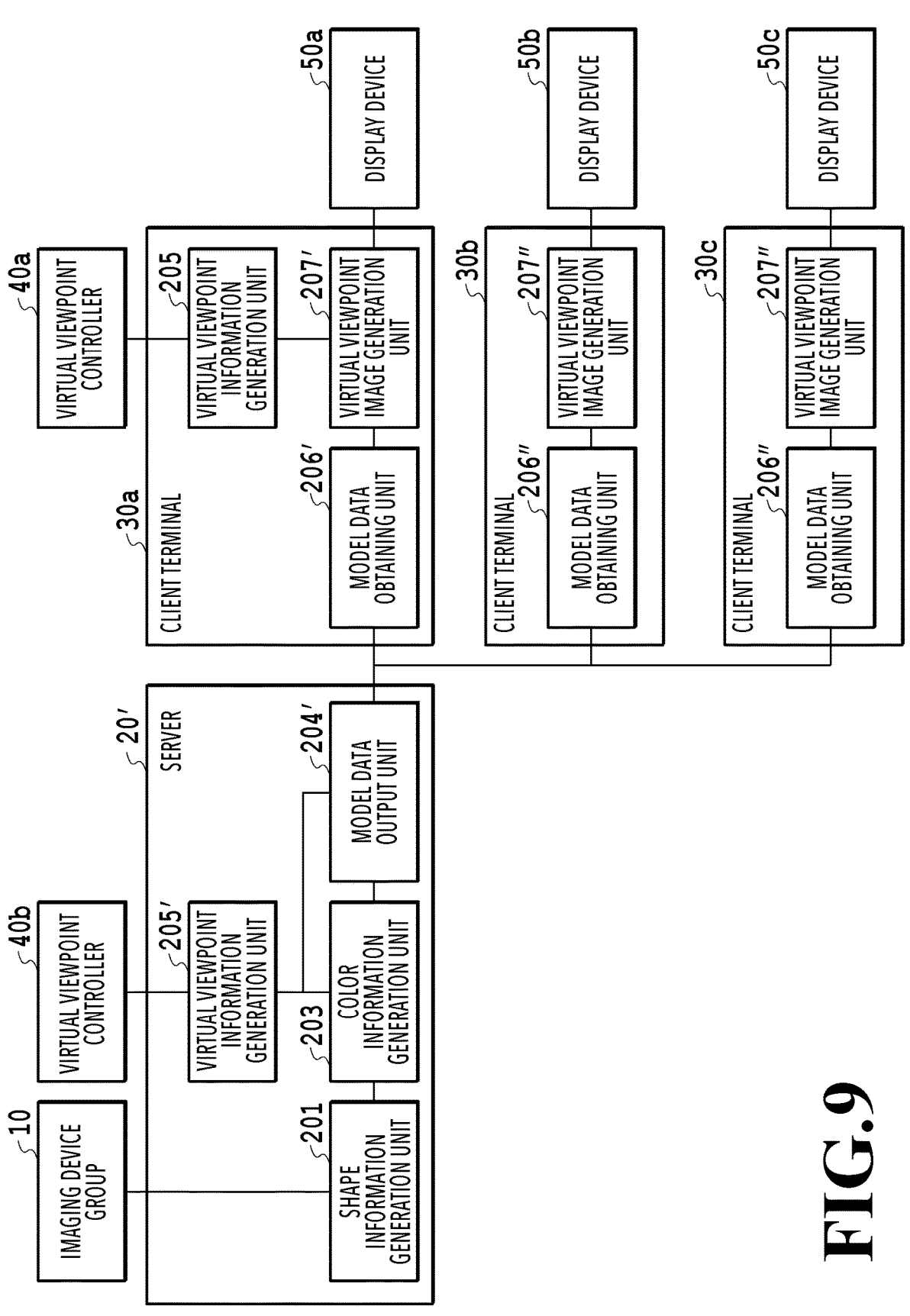
FIG. 9 is a block diagram showing one example of a function configuration of a server and a client terminal according to the second embodiment.

FIG. 9 is a diagram showing one example of the function configuration of the server 20' and the client terminals 30a to 30c according to the present embodiment.

<<Function Configuration of Server>

The server 20' has the shape information generation unit 201, the color information generation unit 203, a virtual viewpoint information generation unit 205', and a model data output unit 204' as processing units for generating model data including virtual viewpoint-dependent color information and providing it to the client terminals 30a to 30c. The large difference from the server 20 according to the first embodiment lies in that the virtual viewpoint information generation unit 205' is comprised in place of the virtual viewpoint information obtaining unit 202.

The virtual viewpoint information generation unit 205' generates virtual viewpoint information based on the operation signal from the virtual viewpoint controller 40b. The generated virtual viewpoint information is output to the color information generation unit 203 and the model data output unit 204'.

The model data output unit 204' transmits and outputs model data to a predetermined output destination via the communication unit 104, which is a dataset in which the virtual viewpoint information input from the virtual viewpoint information generation unit 205' is added to the shape information and color information input from the color information generation unit 203. The predetermined output destination in the present embodiment is the client terminals 30a to 30c. FIG. 10 is a diagram showing the data structure of the model data including virtual viewpoint information. In FIG. 10, "cameraparam (position, rotation and the like) described between "start header" and "end header" indicates the contents of the virtual viewpoint information used in a case where the model data is created. Then, in the area indicated by a broken line, the shape information and color information on the foreground object are described. By incorporating information on the virtual viewpoint in the model data as header information in this manner, it is made possible to generate a virtual viewpoint image also at the client terminals 30b and 30c to which the virtual viewpoint controller is not connected.

There is no difference in particular in the shape information generation unit 201 and the color information generation unit 203 from the first embodiment, and therefore, explanation is omitted.

<<Function Configuration of Client Terminal>

The client terminal 30a is basically the same as the client terminal 30 of the first embodiment and has the virtual viewpoint information generation unit 205', a model data obtaining unit 206', and a virtual viewpoint image generation unit 207'. The virtual viewpoint image generation unit 207' generates a virtual viewpoint image in accordance with the virtual viewpoint information input from the virtual viewpoint information generation unit 205 like the virtual viewpoint image generation unit 207 of the first embodiment. However, it is also possible for the virtual viewpoint image generation unit 207' to generate a virtual viewpoint image in accordance with virtual viewpoint information that is input from the model data obtaining unit 206'.

The client terminals 30b and 30c each have a model data obtaining unit 206" and a virtual viewpoint image generation unit 207". The virtual viewpoint image generation unit 207" generates a virtual viewpoint image in accordance with shape information, color information, and virtual viewpoint information, which are input from the model data obtaining unit 206".

<Way of Thinking of the Present Embodiment>

Figure 11:
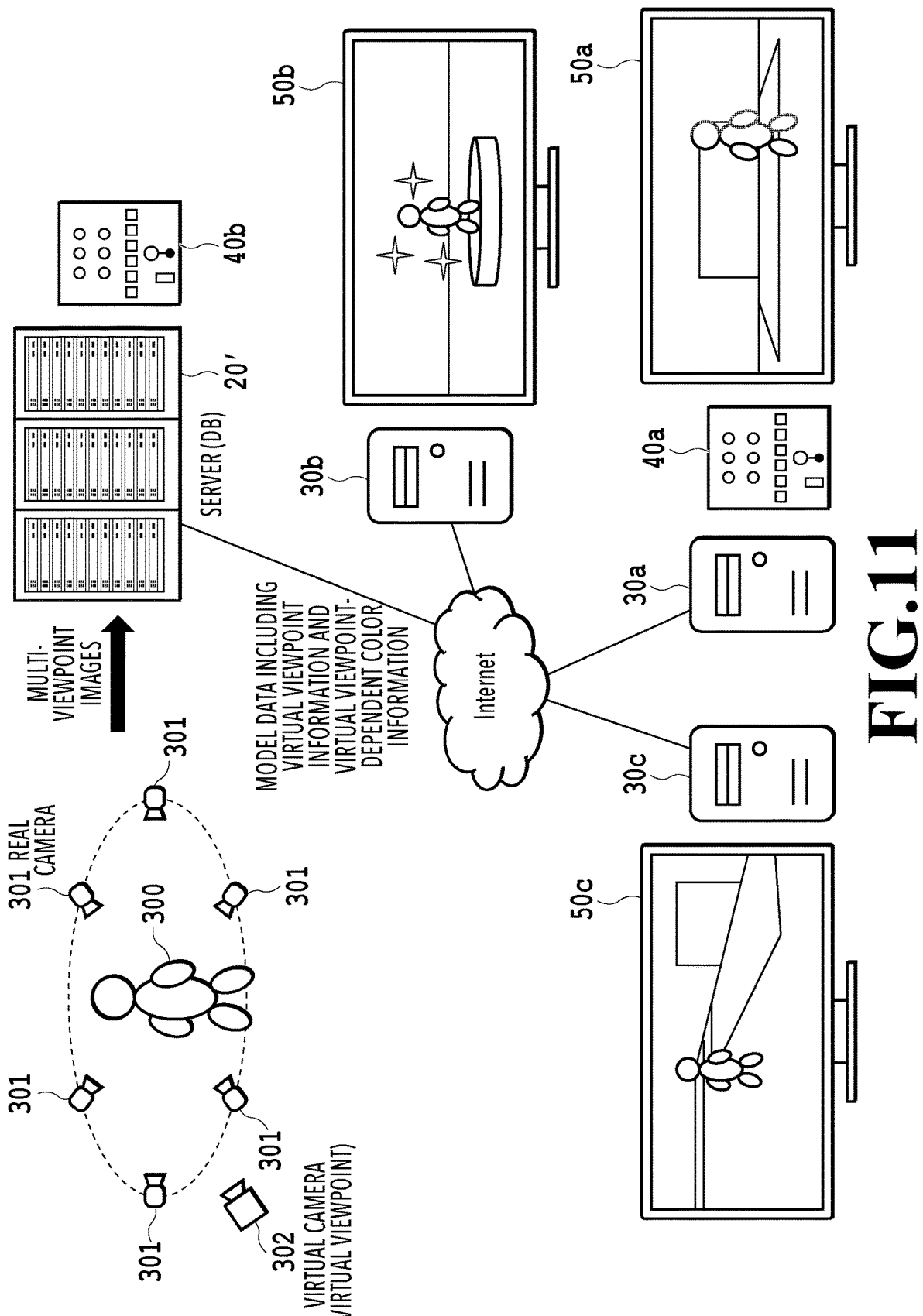
FIG. 11 is a diagram showing an outline until a virtual viewpoint image is generated and displayed according to the second embodiment.

The generation and transmission of model data including virtual viewpoint-dependent color information by the server and further, the generation of a virtual viewpoint image using the model data by the client terminal in the image processing system 1' of the present embodiment are explained with reference to the drawings. FIG. 11 is a diagram showing an outline until a user generates and displays a virtual viewpoint image based on multi-viewpoint images by taking the person 300 as the foreground object as a target according to the present embodiment.

As in FIG. 3 of the first embodiment, each of the real cameras 301 configuring the imaging device group 10 captures the person 300 from different viewpoints and transmits the obtained multi-viewpoint images to the server 20'. In the present embodiment, in a case where a first user designates the position and orientation of the virtual camera 302 by operating the virtual viewpoint controller 40*b*, its operation signal is input to the server 20'. The server 20' generates virtual viewpoint information, which is camera parameters of the virtual camera 302, from the input operation signal. Further, the server 20' generates shape information and color information on the foreground object based on the generated virtual viewpoint information and the received multi-viewpoint images. Then, the server 20' transmits model data including the shape information, color information, and virtual viewpoint information to the client terminals 30*a* to 30*c*.

Then, the client terminals 30*b* and 30*c* each generate a virtual viewpoint image based on the virtual viewpoint information included in the received model data and display and output the virtual viewpoint image on each of the display devices 50*b* and 50*c*. Further, the client terminal 30*a* generates a virtual viewpoint image based on virtual viewpoint information generated by a second user operating the virtual viewpoint controller 40*a* without using the virtual viewpoint information included in the received model data and displays and outputs the virtual viewpoint image on the display device 50*a*. In a case where a virtual viewpoint largely different from the virtual viewpoint on which the color information depends is set by the second user, the image quality of the foreground object is reduced accordingly, but it is possible to obtain an image that is viewed from an arbitrary virtual viewpoint without being limited to the virtual viewpoint included in the model data. The first user and the second user may be the same person or may be different persons.

In a case of the system configuration such as this, at each of the plurality of client terminals, it is possible to generate and view virtual viewpoint images whose contents are different by, for example, adopting different backgrounds, performing composition processing to add special visual effects to the foreground object, and so on.

<Generation and Transmission of Model Data>

Figure 12:
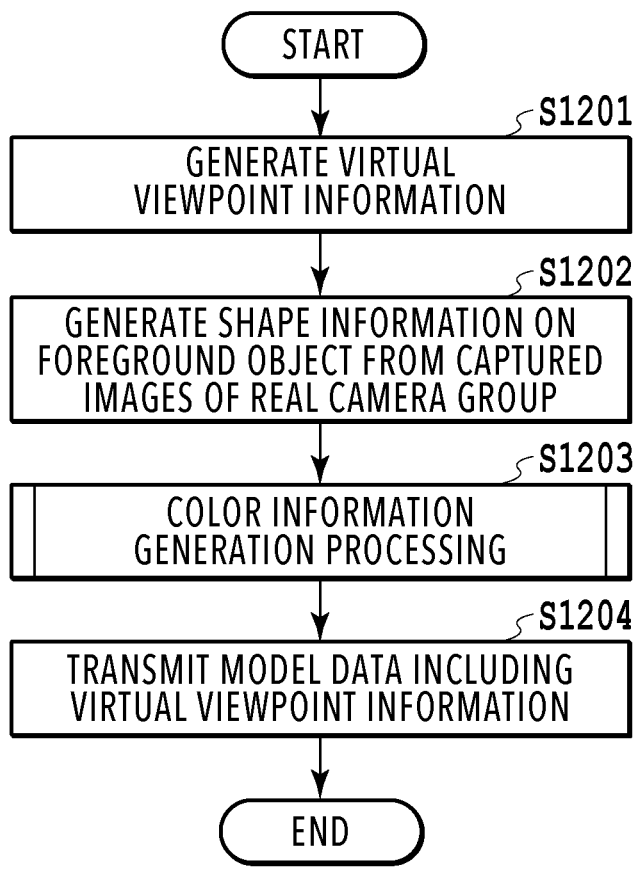
FIG. 12 is a flowchart showing a rough flow of processing to control the generation and transmission of model data of a foreground object in the sever according to the second embodiment.

FIG. 12 is a flowchart showing a rough flow of processing to control the generation and transmission of model data of a foreground object in the server 20' according to the present embodiment. The flow shown in FIG. 12 is implemented by a control program stored in the ROM 103 or the HDD 105 being read onto the RAM 102 and by the CPU 101 executing the control program. The start of the execution of the flow in FIG. 12 is triggered by the virtual viewpoint information generation unit 205' receiving the operation signal of the virtual camera from the virtual viewpoint controller 40*b*.

At S1201, the virtual viewpoint information generation unit 205' generates virtual viewpoint information based on the operation signal received from the virtual viewpoint controller 40*b*. The generated virtual viewpoint information is sent to the color information generation unit 203 and the model data output unit 204'.

At S1202, the shape information generation unit 201 generates shape information on the foreground object based on multi-viewpoint image data. This processing is the same as that at S402 in the flow in FIG. 4 of the first embodiment. The generated shape information is sent to the color information generation unit 203 along with the input multi-viewpoint image data.

At S1203, the color information generation unit 203 generates color information on the foreground object based on the shape information on the foreground object and the multi-viewpoint image data, which are input from the shape information generation unit 201, and the virtual viewpoint information input from the virtual viewpoint information generation unit 205'. The contents of this color information generation processing are the same as those at S403 in the flow in FIG. 4 of the first embodiment. The generated color information is sent to the model data output unit 204' along with the shape information used for the generation.

At S1204, the model data output unit 204' adds the virtual viewpoint information input from the virtual viewpoint information generation unit 205' to the shape information and color information input from the color information generation unit 203 and transmits and outputs it to the client terminal 30 as model data.

The above is the contents of the processing to control the generation and transmission of the model data of the foreground object in the server 20'.

<Generation of Virtual Viewpoint Image>

FIG. 13A is a flowchart showing a flow of generation processing of a virtual viewpoint image using model data at the client terminal 30*a* according to the present embodiment. The execution of the flow in FIG. 13A is started in response to the reception of the model data from the server 20'.

At S1301, the model data obtaining unit 206' receives the model data from the server 20' and reads shape information and color information from the received model data. The read shape information and color information are sent to the virtual viewpoint image generation unit 207'.

At S1302, the next processing is allocated in accordance with whether or not an operation signal is received from the virtual viewpoint controller 40*a*. In a case where no operation signal is received, the processing advances to S1303 and in a case where an operation signal is received, the processing advances to S1304.

At S1303, the model data obtaining unit 206' reads virtual viewpoint information from the model data received from the server 20'. The read virtual viewpoint information is sent to the virtual viewpoint image generation unit 207'.

At S1304, the virtual viewpoint information generation unit 205 generates virtual viewpoint information based on the operation signal received from the virtual viewpoint controller 40*a*. The generated virtual viewpoint information is sent to the virtual viewpoint image generation unit 207'.

At S1305, the virtual viewpoint image generation unit 207' generates a virtual viewpoint image based on the input virtual viewpoint information, shape information, and color information. The data of the generated virtual viewpoint image is transmitted to the display device 50 and displayed by the display device 50.

The above is the contents of the generation processing of a virtual viewpoint image at the client terminal 30*a*. In a case where the virtual viewpoint information included in the model data is not used but the virtual viewpoint information obtained by operating the unique virtual viewpoint controller 40*a* is used, it may also be possible to limit the range in which the virtual camera can be set so that the deterioration of the image quality of the foreground object is not conspicuous. Specifically, the range is limited by preventing the virtual camera from becoming close to the foreground object beyond a predetermined distance, and so on. Further, it may also be possible to superimpose and display information indicating the area of the virtual camera in which the foreground object can be drawn beautifully in accordance with the virtual viewpoint information included in the model data on the virtual viewpoint image. By doing so, it is made possible for a user to designate the position of the virtual camera within the area and obtain a virtual viewpoint image whose deterioration of image quality has been reduced.

FIG. 13B is a flowchart showing a flow of generation processing of a virtual viewpoint image using model data at the client terminals 30b and 30c according to the present embodiment. The execution of the flow in FIG. 13B is also started in response to the reception of the model data from the server 20'.

At S1311, the model data obtaining unit 206" receives model data from the server 20' and reads virtual viewpoint information, in addition to shape information and color information, from the received model data. The read shape information, color information, and virtual viewpoint information are sent to the virtual viewpoint image generation unit 207".

At S1312, the virtual viewpoint image generation unit 207" generates a virtual viewpoint image based on the virtual viewpoint information, shape information, and color information, which are input from the model data obtaining unit 206". The data of the generated virtual viewpoint image is transmitted to the display device 50 and displayed by the display device 50.

The above is the contents of the generation processing of a virtual viewpoint image at the client terminals 30b and 30c.

As above, in a case of the present embodiment, the server provides model data including virtual viewpoint information to the client terminal. Consequently, it is also possible for a user in an environment not having the virtual viewpoint controller to generate and view a virtual viewpoint image of high image quality by using the model data at the client terminal. Further, even in a case where users (client terminals) increase in number, it is only necessary for the server to generate model data once, and therefore, it is also possible to suppress an increase in the processing load of the server, which accompanies an increase in the number of users.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like According to the present disclosure, it is possible to output data that enables the generation of a virtual viewpoint image of high image quality while suppressing the amount of data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   one or more memories storing instructions; and
   one or more processors executing the instructions to perform:
   (1) obtaining virtual viewpoint information for identifying a position of a virtual viewpoint and a line-of-sight direction from the virtual viewpoint;
   (2) generating color information for an element configuring three-dimensional shape data for identifying a three-dimensional shape of an object based on the virtual viewpoint information and a plurality of images captured from a plurality of imaging devices; and
   (3) outputting the three-dimensional shape data and the color information,
   wherein the color information is generated based on the virtual viewpoint information and the plurality of images for an element corresponding to a partial area displayed in a virtual viewpoint image representing an appearance from the virtual viewpoint among elements configuring the three-dimensional shape data, and
   wherein color information for another element different from the element corresponding to the partial area displayed in the virtual viewpoint image representing the appearance from the virtual viewpoint among the elements configuring the three-dimensional shape data is color information that does not depend on the virtual viewpoint.

2. The information processing apparatus according to claim 1, wherein the element corresponding to the partial area displayed in the virtual viewpoint image is determined based on the position of the virtual viewpoint and the line-of-sight direction from the virtual viewpoint, both being identified by the virtual viewpoint information.

3. The information processing apparatus according to claim 1, wherein the color information is generated based on an image selected from among the plurality of images based on the position of the virtual viewpoint and the line-of-sight direction from the virtual viewpoint, both being identified by the virtual viewpoint information.

4. The information processing apparatus according to claim 1, wherein the one or more processors further execute the instructions to perform control so that the plurality of images is not output.

5. The information processing apparatus according to claim 1, wherein the virtual viewpoint information further includes information for identifying a viewing angle of the virtual viewpoint image.

6. The information processing apparatus according to claim 1, wherein the three-dimensional shape data is generated based on the virtual viewpoint information.

7. The information processing apparatus according to claim 1, wherein the three-dimensional shape data is one of point cloud, mesh data, and voxel data.

8. The information processing apparatus according to claim 1, wherein the virtual viewpoint information is obtained by reception from an external device via a communication unit.

9. The information processing apparatus according to claim 8, wherein the three-dimensional shape data and the color information are output to the external device.

10. The information processing apparatus according to claim 9, wherein the external device generates a virtual viewpoint image representing an appearance from the virtual viewpoint based on the three-dimensional shape data and the color information.

11. The information processing apparatus according to claim 10, wherein the one or more processors further execute the instructions to perform:

outputting the virtual viewpoint information, the three-dimensional shape data, and the color information to an external device different from a device that designates the virtual viewpoint.

12. An information processing method comprising the steps of:

obtaining virtual viewpoint information for identifying a position of a virtual viewpoint and a line-of-sight direction from the virtual viewpoint;

generating color information for an element configuring three-dimensional shape data for identifying a three-dimensional shape of an object based on the virtual viewpoint information and a plurality of images captured from a plurality of imaging devices; and outputting the three-dimensional shape data and the color information, wherein the color information is generated based on the virtual viewpoint information and the plurality of images for an element corresponding to a partial area displayed in a virtual viewpoint image representing an appearance from the virtual viewpoint among elements configuring the three-dimensional shape data, and wherein color information for another element different from the element corresponding to the partial area displayed in the virtual viewpoint image representing the appearance from the virtual viewpoint among the elements configuring the three-dimensional shape data is color information that does not depend on the virtual viewpoint.

13. A non-transitory computer-readable storage medium storing a program for causing a computer to perform an information processing method comprising the steps of:

obtaining virtual viewpoint information for identifying a position of a virtual viewpoint and a line-of-sight direction from the virtual viewpoint;

generating color information for an element configuring three-dimensional shape data for identifying a three-dimensional shape of an object based on the virtual viewpoint information and a plurality of images captured from a plurality of imaging devices; and outputting the three-dimensional shape data and the color information, wherein the color information is generated based on the virtual viewpoint information and the plurality of images for an element corresponding to a partial area displayed in a virtual viewpoint image representing an appearance from the virtual viewpoint among elements configuring the three-dimensional shape data, and wherein color information for another element different from the element corresponding to the partial area displayed in the virtual viewpoint image representing the appearance from the virtual viewpoint among the elements configuring the three-dimensional shape data is color information that does not depend on the virtual viewpoint.

14. An information processing apparatus comprising:

one or more memories storing instructions; and one or more processors executing the instructions to perform:

(1) obtaining virtual viewpoint information for identifying a position of a virtual viewpoint and a line-of-sight direction from the virtual viewpoint;

(2) generating color information for an element configuring three-dimensional shape data for identifying a three-dimensional shape of an object based on the virtual viewpoint information and a plurality of images captured from a plurality of imaging devices; and (3) outputting the three-dimensional shape data and the color information, wherein the color information is generated based on the virtual viewpoint information and the plurality of images for an element corresponding to a partial area displayed in a virtual viewpoint image representing an appearance from the virtual viewpoint among elements configuring the three-dimensional shape data, wherein the generating deletes another element different from the element corresponding to the partial area displayed in the virtual viewpoint image representing the appearance from the virtual viewpoint among the elements configuring the three-dimensional shape data, and wherein the three-dimensional shape data that is output is three-dimensional shape data from which the another element is deleted.

15. An information processing method comprising the steps of:

obtaining virtual viewpoint information for identifying a position of a virtual viewpoint and a line-of-sight direction from the virtual viewpoint;

generating color information for an element configuring three-dimensional shape data for identifying a three-dimensional shape of an object based on the virtual viewpoint information and a plurality of images captured from a plurality of imaging devices; and outputting the three-dimensional shape data and the color information, wherein the color information is generated based on the virtual viewpoint information and the plurality of images for an element corresponding to a partial area displayed in a virtual viewpoint image representing an appearance from the virtual viewpoint among elements configuring the three-dimensional shape data, wherein the generating deletes another element different from the element corresponding to the partial area displayed in the virtual viewpoint image representing the appearance from the virtual viewpoint among the elements configuring the three-dimensional shape data, and wherein the three-dimensional shape data that is output is three-dimensional shape data from which the another element is deleted.

16. A non-transitory computer-readable storage medium storing a program for causing a computer to perform an information processing method comprising the steps of:

obtaining virtual viewpoint information for identifying a position of a virtual viewpoint and a line-of-sight direction from the virtual viewpoint;

generating color information for an element configuring three-dimensional shape data for identifying a three-dimensional shape of an object based on the virtual viewpoint information and a plurality of images captured from a plurality of imaging devices; and outputting the three-dimensional shape data and the color information, wherein the color information is generated based on the virtual viewpoint information and the plurality of images for an element corresponding to a partial area displayed in a virtual viewpoint image representing an appearance from the virtual viewpoint among elements configuring the three-dimensional shape data, wherein the generating deletes another element different from the element corresponding to the partial area displayed in the virtual viewpoint image representing the appearance from the virtual viewpoint among the elements configuring the three-dimensional shape data, and wherein the three-dimensional shape data that is output is three-dimensional shape data from which the another element is deleted.

* * * * *